June 1, 1971     H. T. P. F. LAKEMAN     3,582,297

METHOD OF MANUFACTURING A FIBER-OPTICAL ELEMENT

Filed Aug. 28, 1967

INVENTOR.
HENRICUS TH. P. F. LAKEMAN

BY
AGENT

3,582,297
METHOD OF MANUFACTURING A FIBER-OPTICAL ELEMENT

Henricus Theophile Petrus Franciscus Lakeman, Emmasingel, Eindhoven, Netherlands, assignors to U.S. Philips Corporation, New York, N.Y.
Filed Aug. 28, 1967, Ser. No. 663,782
Claims priority, application Netherlands, Sept. 2, 1966, 6612387
Int. Cl. C03c 15/00, 23/20
U.S. Cl. 65—4          4 Claims

ABSTRACT OF THE DISCLOSURE

In the method of manufacturing a fiber-optical element in which a rod-shaped glass body having a high refractive index and containing a small quantity of monovalent ions surrounded by a glass sheath of low refractive index after being drawn into glass fibers which are assembled into a body which is again drawn to reduce its size and the fibers fused into a compact stack with minimum deformation, the monovalent ions are exchanged for other ions which increase the light absorption by the sheath.

---

Figure 1:
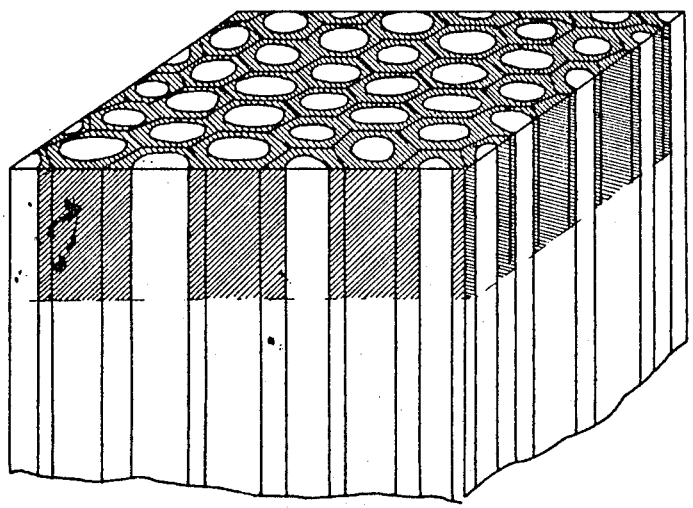

The invention relates to a method of manufacturing a fiber-optical element and to an element obtained by such a method.

In recent years, fiber-optical elements which consist of a bundle of glass fibers of very small diameter serving to transmit light are frequently used in cases in which even images of very small brightness are transmitted without definition losses due to dispersion. They are used, for example, in image intensifiers and in television camera tubes.

The effect of such a fiber is due to the fact that a light beam which is incident on one end face of the fiber is reflected completely from the side walls of the fiber and thus remains substantially entirely inside the fiber and reaches the other end with practically the same intensity. In order to achieve this, such a fiber comprises a cylindrical core of a material having a high refractive index ($n_1$) concentrically surrounded by a sheath of glass having a low refractive index ($n_2$). The term "cylindrical" is employed herein to signify any form of constant closed cross-section, hence not only a circular but also a rectangular or polygonal form.

It is known to manufacture a fiber-optical element by drawing a rod-shaped body comprising a core of glass having a high refractive index and a concentrical sheath of glass having a low refractive index to fibers having cross-sections approximately corresponding to that of the rod-shaped body, whereupon the so obtained fibers are joined to form a bundle and drawn again, which latter two operations may then be repeated. The resulting bundle is then fused together to a compact stack with a minimum of deformation and the occurrence of foreign occlusions, especially of gas bubbles between the fibers is prevented.

As already stated, losses of definition due to dispersed rays should be avoided. For this purpose, first, the critical angle i.e., the angle between the light beam incident on the fiber-optical element and the normal to the end face of the fiber, should be at a maximum. All the light beams incident on the end face of the fiber at an angle which is smaller than this critical angle, remain inside the same fiber due to complete reflection. The relation between this critical angle $\theta$, the refractive indices of the two kinds of glass and the refractive index of the ambience ($n_0$) is:

$$n_0 \sin \theta = \sqrt{n_1^2 - n_2^2}$$

By suitable choice of the refractive indices of the two kinds of glass, this critical angle $\theta$ may be approximately 90° when the fiber-optical element is arranged freely, i.e., in an ambience of air. This means that all light, even the light incident at an extremely small angle, once it enters into the fiber, remains in it due to complete reflection.

Glass are available for the sheath of the fiber which have a refractive index ($n_2$) of approximately 1.50. The composition of these glasses in mol. percent lies within the following limits:

| | | |
|---|---|---|
| $GeO_2$ | 35–62%, preferably 40–55% | |
| $BaO$ | 10–30%, preferably 15–21% | |
| $TiO_2$ | 0–30%, preferably 3–13% | |
| $La_2O_3$ | 0–15%, preferably 3–10% | ⎫ |
| $ZrO_3$ | 0–10% | ⎬ In all at least 10%. |
| $Ta_2O_5$ | 0–5% | ⎪ |
| $ZnO$ | 5–15% | ⎭ |

With a combination of one of the latter glasses for the core and one of the former glasses for the sheath, the attainable value for $\sqrt{n_1^2 - n_2^2}$ lies between approximately 1 and well over 1.

The main source of a dispersed light is light incident on an end face of the fiber-optical element the glass of the sheath at an angle differing from 0°. The glass of the sheath must naturally have a limited minimum thickness, since otherwise "cross-talk" may occur between the fibers. This minimum value is of the order of a few tenths of a micron. This means that in a cross-section of the fiber-optical element, the surface area of the sheath occupies 30 to 40% of the overall surface area. When compared with this source, other incidental errors producing scattered light, such as faults at the interface and gas bubbles or crystals in the glass of the core of the fiber have only slight influence. Moreover, the presence of a zone having a refractive index ($n_0$) which largely exceeds 1, such as an immersion or a layer of luminescent material with a binder applied to the end face of a fiber-optical element, should be taken into account. The critical angle $\theta$ is then considerably reduced, which already appears from the said equation $n_0 \sin \theta = \sqrt{n_1^2 - n_2^2}$.

Various attempts have already been made to absorb the scattered light.

For example, the fiber or a bundle of fibers may be enveloped with a colored glass or enamel. This has the disadvantage that the filling factor of the fiber-optical element, which corresponds in a cross-section of the element to the fraction of the overall surface of the cross-section of the element constituted by the sum of the surfaces of the cross-sections of the core of the fiber, decreases, because the glass sheath must have a thickness which is twice that required to prevent cross-talk. As a result, the light transmission of the element is directly reduced.

As an alternative, the glass of the sheath may be colored, but this also involves an unduly large absorption.

The known method in which the surface of the element is etched with a reagent which attacks the sheath of the fiber more strongly than the core, whereupon a layer impervious to light is applied which fills the cavities formed and is then ground and polished at the area of the core, is very circuitous. Moreover, this method results in an absorbing layer of small depth so that only part of the scattered radiation is eliminated.

When using the method according to the invention, a fiber-optical element is obtained in which definition losses owing to scattered radiation are satisfactorily counteracted. Even scattered radiation resulting from defective areas in the core is eliminated by absorption on the lower side of the fiber-optical element.

The method according to the invention is characterized in that in the glass of the sheath of the element obtained by the known method and comprising a compact bundle of glass fibers constituted by a core of glass having a high refractive index and containing at the most a few percent of monovalent ions and a concentrical sheath of glass having a low refractive index, monovalent cations are exchanged for such other cations that the light absorption of this glass increases.

In a preferred embodiment of the method, alkali ions in the glass are exchanged for silver ions, since the diffusion velocity of the silver ions in the glass is high. The glass may then contain electron donors such as $As_2O_3$ or $Sb_2O_3$, so that the diffused silver ions are converted to black-colored particles (conglomerates of metal atoms). In a particularly suitable method, no reducing compounds are added to the glass, but the glass containing the silver ions is heated for some time in a reducing atmosphere.

The ions can be introduced by coating the surface of the fiber-optical element with a paste containing the relevant metal ions, by then heating the assembly and rinsing away the remaining paste after cooling, or the fiber-optical element may be immersed in a bath of a molten salt or salt mixture containing the relevant metal ions.

In another embodiment of the method according to the invention, the diffusion of the metal ions is accelerated by an electric field and a larger depth of penetration can then be obtained. For this purpose, one surface of the fiber-optical element in a position at right angles to the longitudinal direction of the fibers is coated with electrically conducting paste containing the relevant metal ions, which surface then acts as an anode and the opposite surface is coated with a graphite paste and then acts as a cathode, the electric field being maintained until the desired depth of penetration has been attained.

By treating the fiber-optical plate with silver ions, it may be colored on both sides. A layer of 10 to 20 microns is sufficient to effectively suppress the dispersed radiation. The fact that the glass of the sheath is not colored entirely from one side of the element to the other, but only for a fraction of approximately 1% of the thickness, is especially favorable, since the internal absorption is thus considerably reduced, so that the loss of light is much smaller than in the aforementioned known method in which the whole sheath is colored.

By the way, it should be noted that the method used in accordance with the invention for exchanging alkali ions in the glass for ions which increase the light absorption, is particularly suitable to render absorbing the sides of a glass body which is provided on the window of a camera tube of the "Vidicon" type for reducing halo effects, the target plate of this tube, which is disposed on the inner side of the window, preferably consisting of lead monoxide as disclosed and claimed in French Pat. No. 1,389,809.

Figure 2:
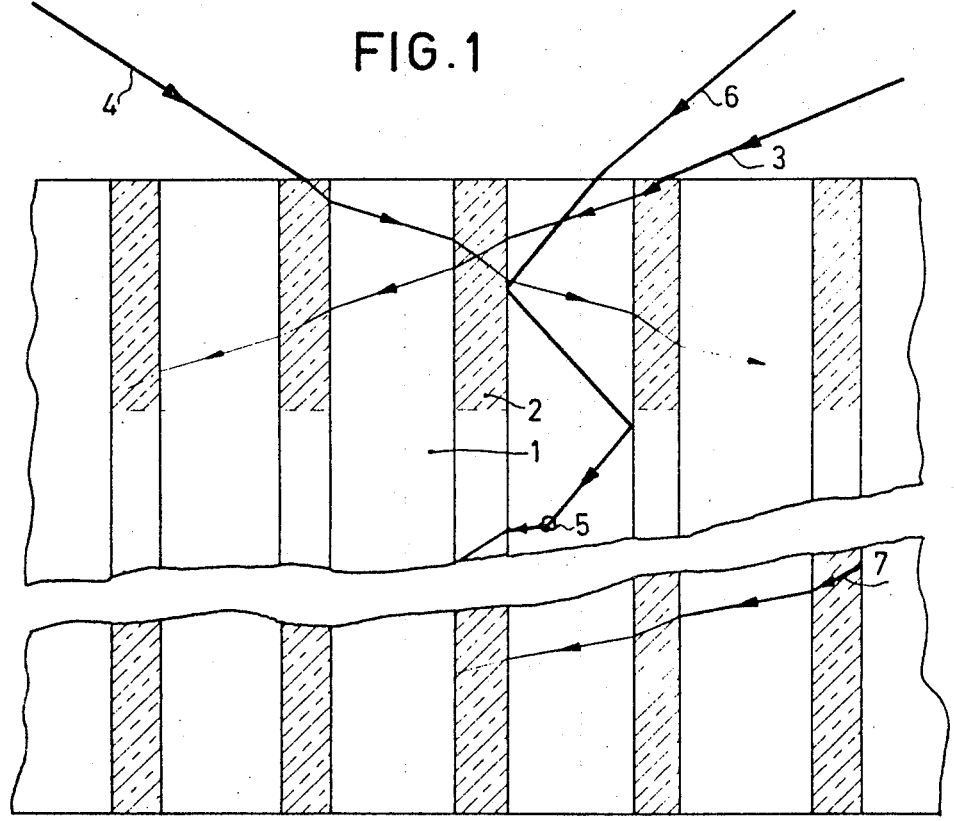

The invention will now be described with reference to the accompanying drawing, in wheih FIG. 1 is a perspective view (shown on a greatly enlarged scale) of a part of a fiber-optical element obtained by the method according to the invention, and FIG. 2 is a cross-section of a part of the element parallel to the longitudinal axis of the fibers.

First a glass tube was manufactured which has a wall thickness of 1 to 1.5 mm., an outer diameter of 17.5 mm. and a length of 300 mm. and which consisted of glass having the composition:

| | Percent by weight |
|---|---|
| $SiO_2$ | 60.1 |
| $B_2O_3$ | 22.6 |
| $Al_2O_3$ | 3.9 |
| $Na_2O$ | 13.4 |

This glass had a refractive index $n_D=1.50$ and a linear coefficient of expansion of $70 \times 10^{-7}/°$ C. between 30 and 300° C. A cylinder of the same length and of the following composition was fitted by grinding in this tube:

$GeO_2$: 50.0 mol percent corresponding to 40.5% by weight
$BaO$: 19.3 mol percent corresponding to 22.8% by weight
$TiO_2$: 7.7 mol percent corresponding to 4.8% by weight
$La_2O_3$: 7.0 mol percent corresponding to 17.6% by weight
$ZrO_2$: 5.0 mol percent corresponding to 4.7% by weight
$Ta_2O_5$: 1.0 mol percent corresponding to 3.4% by weight
$ZnO$: 10.0 mol percent corresponding to 6.2% by weight This glass had a refractive index $n_D=1.855$ and a linear coefficient of expansion of $74 \times 10^{-7}/°$ C. between 30 and 300° C.

The combination thus obtained was first drawn to fibers of approximately 300μ diameter at a temperature of 850° C. These fibers were compressed to bundles of 12 mm. diameter and these bundles again drawn to 300μ so that the original fiber obtained a core diameter of approximately 6.5μ. The composite fibers so obtained were cut to lengths of 100 mm. and tightly compressed in an ampulla having a diameter of 25 mm. made of borosilicate glass of the first-mentioned composition. The filled ampulla was evacuated, sealed and heated for half an hour to one hour at a temperature of 680 to 700° C. Plate-shaped fiber-optical elements were cut from the product obtained and immersed for 6 hours in a melt containing 20% by weight of $AgNO_3$ and 80% by weight of $KNO_3$ and heated at 350° C. After cooling in air, the plates were carefully washed with distilled water and then heated in hydrogen gas for half an hour at 500° C.

The sheath of the carefully cleaned plate was colored black on both sides to a depth of 15μ and the glass of the core had remained perfectly transparent. FIG. 1 shows in a perspective view a section through a part of such a fiber-optical element.

FIG. 2 is a cross-sectional view parallel to the axis of the fibers, the core being denoted by 1 and the sheath colored black to a depth of 15μ by 2. Attention is drawn to the light beams 3 and 4 which obliquely travel through the optical element and pass several times through the colored sheath. Upon each passage, a large part is absorbed; thus, when it has passed several times through a layer of sheath glass, the light beam is substantially completely extinguished. This dispersed light is thus completely eliminated, which becomes manifest in the considerable improvement of the resolving power of a fiber-optical plate obtained by the method according to the invention with respect to a similar uncolored plate. The core has an irregularity 5 by which the light beam 6, which hitherto remained inside the fiber due to complete reflection, is refracted so that it emerges from the fiber and laterally passes through the element. A similar light beam 7 is shown, which thus has reached the lower side of the element. This scattered light beam is also absorbed by the black-colored glass of the sheath.

While the invention has been described with reference to particular embodiments and applications thereof, other modifications will be readily apparent to those skilled in the art without departing from the spirit and scope of the invention which is defined in the appended claims.

What is claimed is:

1. In the method of manufacturing a fiber-optical element comprising the steps of drawing a rod-shaped body, which comprises a core of glass having a high refractive index and containing at the most a few percent of monovalent ions and a concentrical sheath of glass having a low refractive index into glass fibers having a structure approximately similar to that of the rod-shaped body, concentrating said fibers to form an assembly, drawing said assembly to reduce the size thereof, fusing the resulting fibers together into a compact stack with a minimum of deformation, the step of exchanging monovalent cations in the glass of the sheath of the element for other cations which increase the light absorption.

2. A method as claimed in claim 1 in which alkali-ions in the sheath glass are exchanged for silver ions under reducing conditions.

3. A method as claimed in claim 2 in which after diffusion of silver ions, the fiber-optical element is heated in a reducing atmosphere.

4. A method as claimed in claim 2 in which the exchange is accelerated by an electric field acting in longitudinal direction of the fibers.

References Cited

UNITED STATES PATENTS

| | | | |
|---|---|---|---|
| 2,749,794 | 6/1956 | O'Leary | 65—31X |
| 2,995,970 | 8/1961 | Hick, Jr., et al. | 65—LRDIGUX |
| 3,139,340 | 6/1964 | Hays et al. | 65—LRDIGUX |
| 3,195,219 | 7/1965 | Woodcock et al. | 65—LRDIGUX |
| 3,218,220 | 11/1965 | Weber | 65—31XR |
| 3,237,039 | 2/1966 | Flyer | 65—LRDIGUX |
| 3,379,558 | 4/1968 | Upton | 65—4X |
| 3,393,987 | 7/1968 | Plumat | 65—30X |
| 3,395,994 | 8/1968 | Cuff | 63—30X |
| 3,436,142 | 4/1969 | Siegmund et al. | 65—4X |
| 3,528,847 | 9/1970 | Grego et al. | 65—30X |
| 3,495,963 | 2/1970 | Buckley et al. | 65—30 |
| 3,486,808 | 12/1969 | Hamblen | 65—30X |

FRANK W. MIGA, Primary Examiner

U.S. Cl. X.R.

65—30, 43, 37; 106—52